Aug. 10, 1965 H. E. BRAGG ETAL 3,199,404
METHOD AND APPARATUS FOR AUTOMATICALLY AND REPETITIVELY MAKING
COPIES OF PRESELECTED PORTIONS OF MOTION PICTURE FILMS
Filed Sept. 21, 1962 9 Sheets-Sheet 2
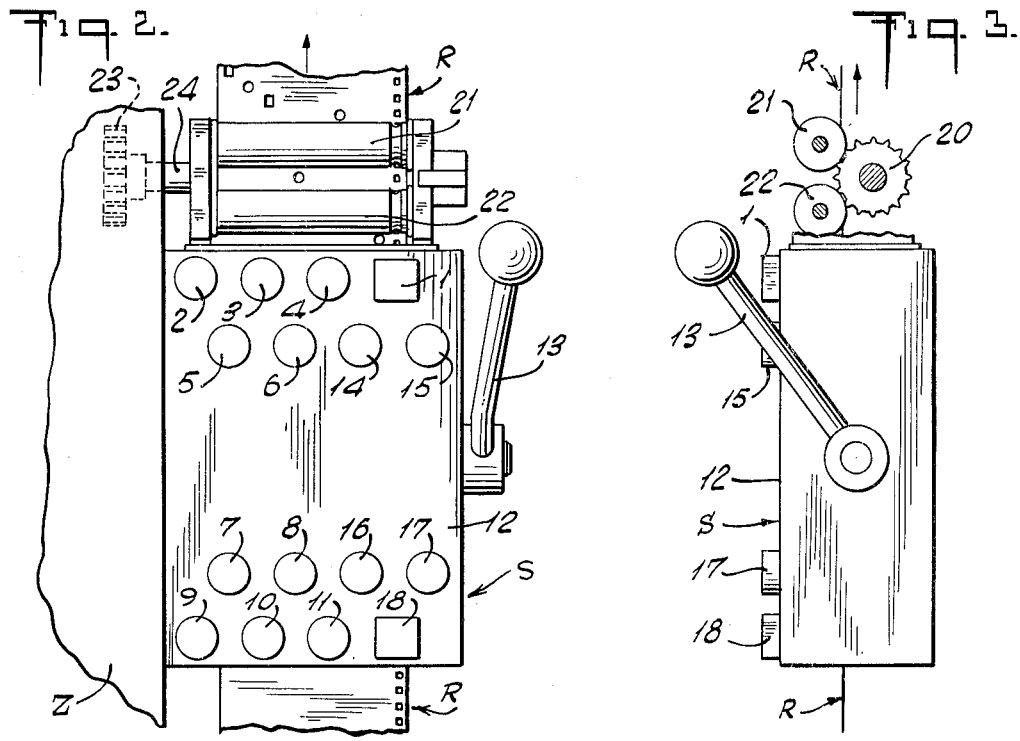
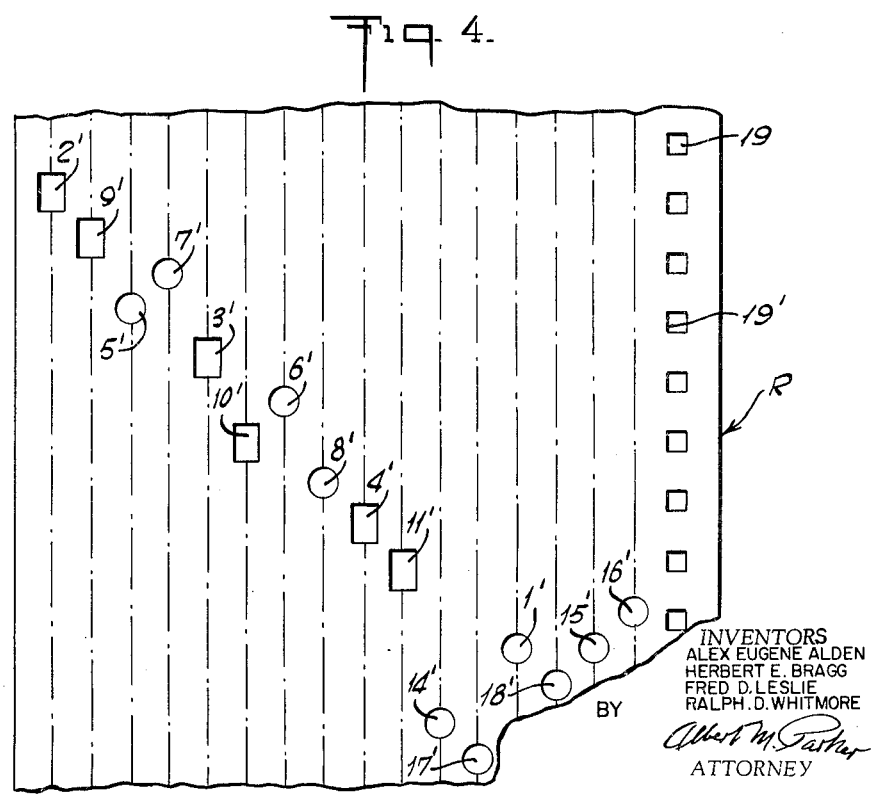
INVENTORS
ALEX EUGENE ALDEN
HERBERT E. BRAGG
FRED D. LESLIE
RALPH D. WHITMORE
BY
ATTORNEY

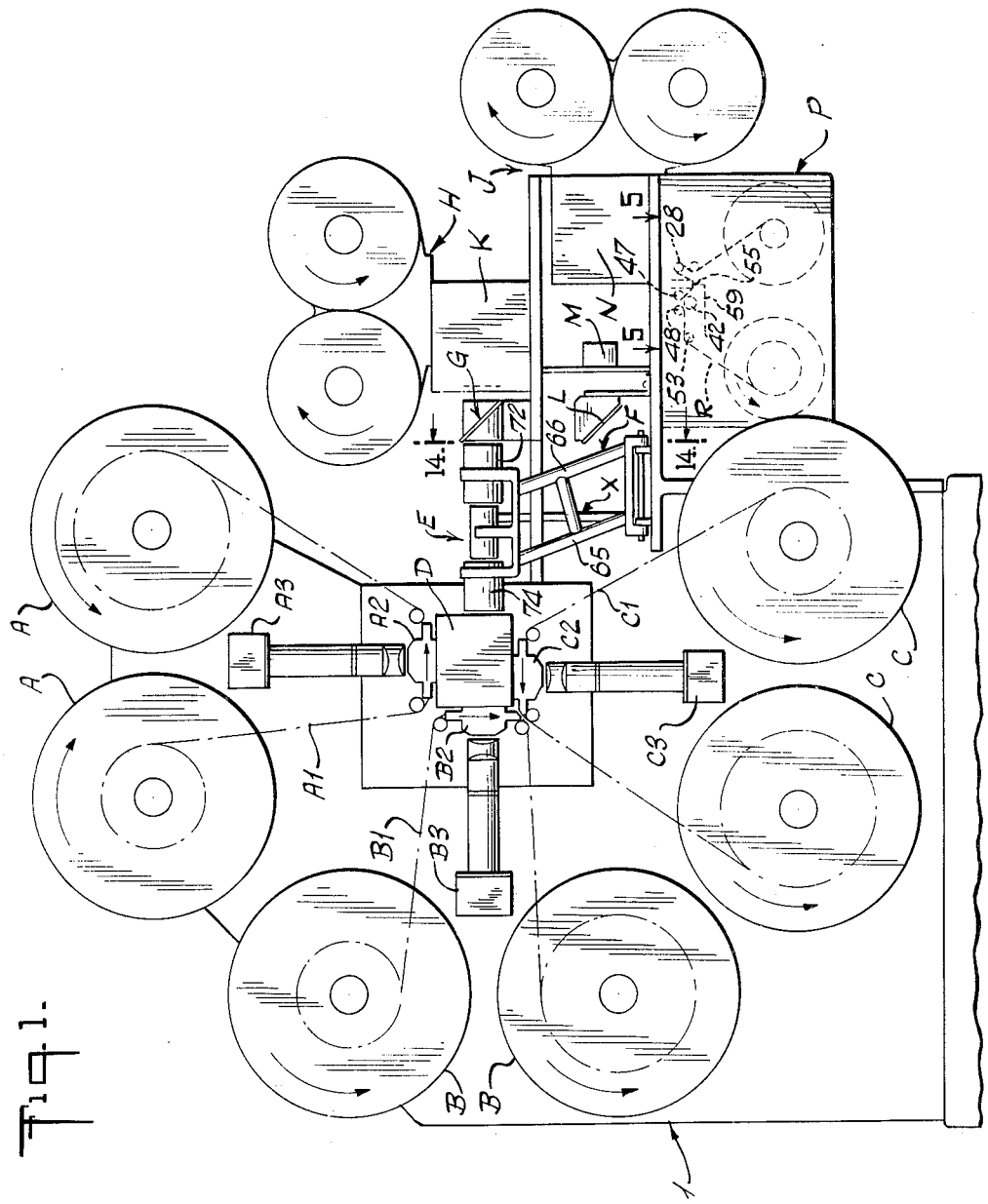

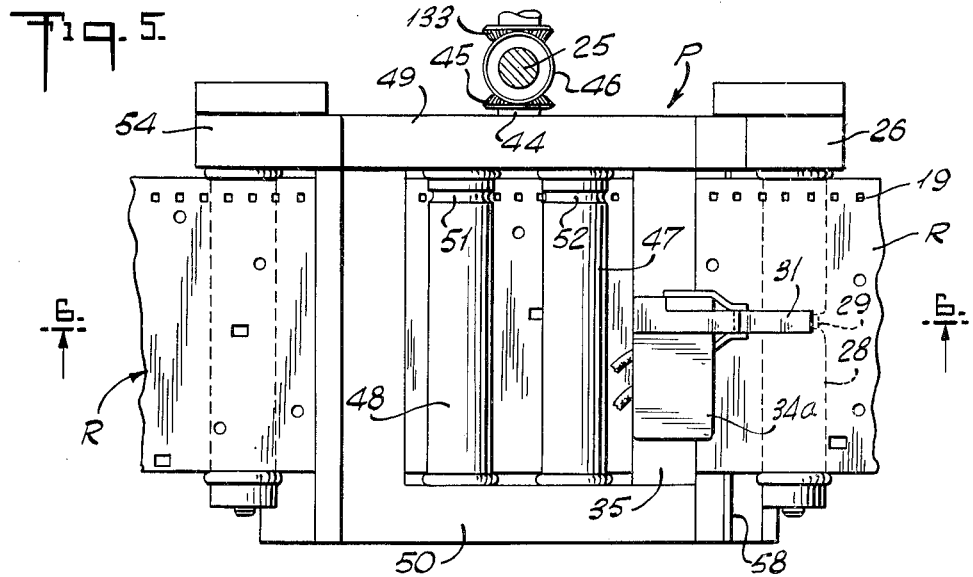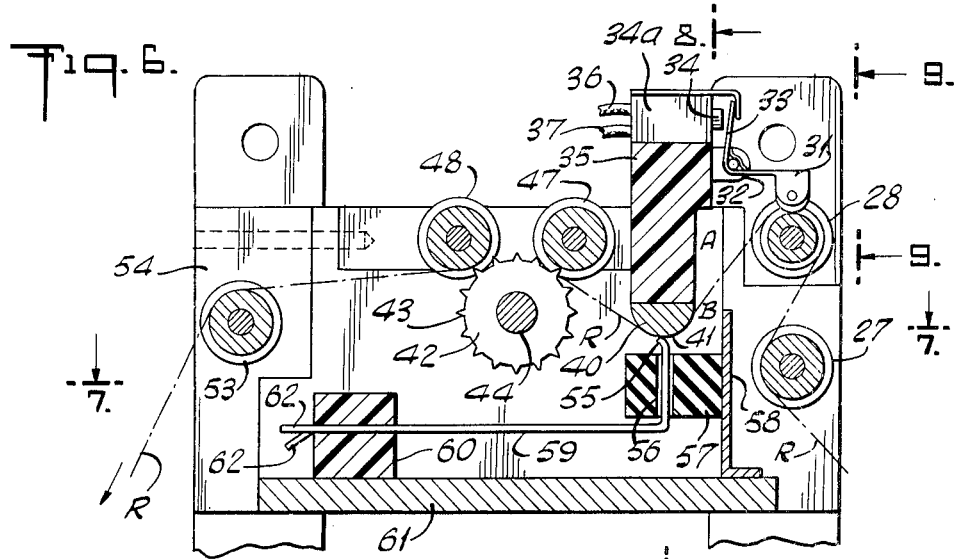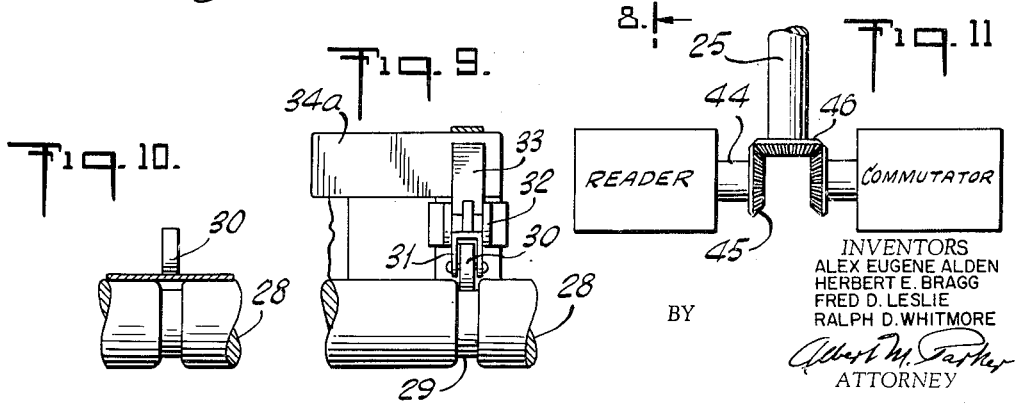

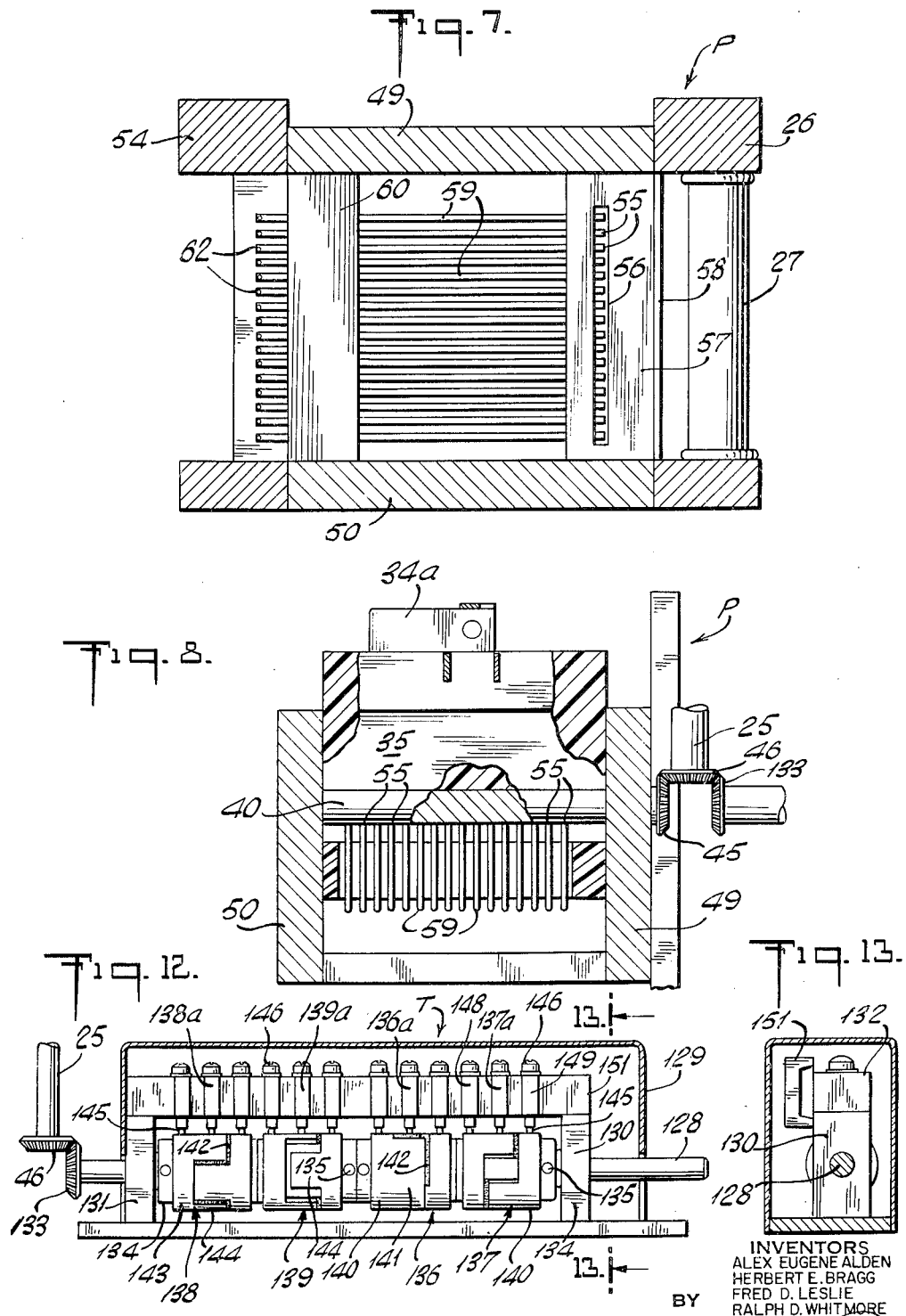

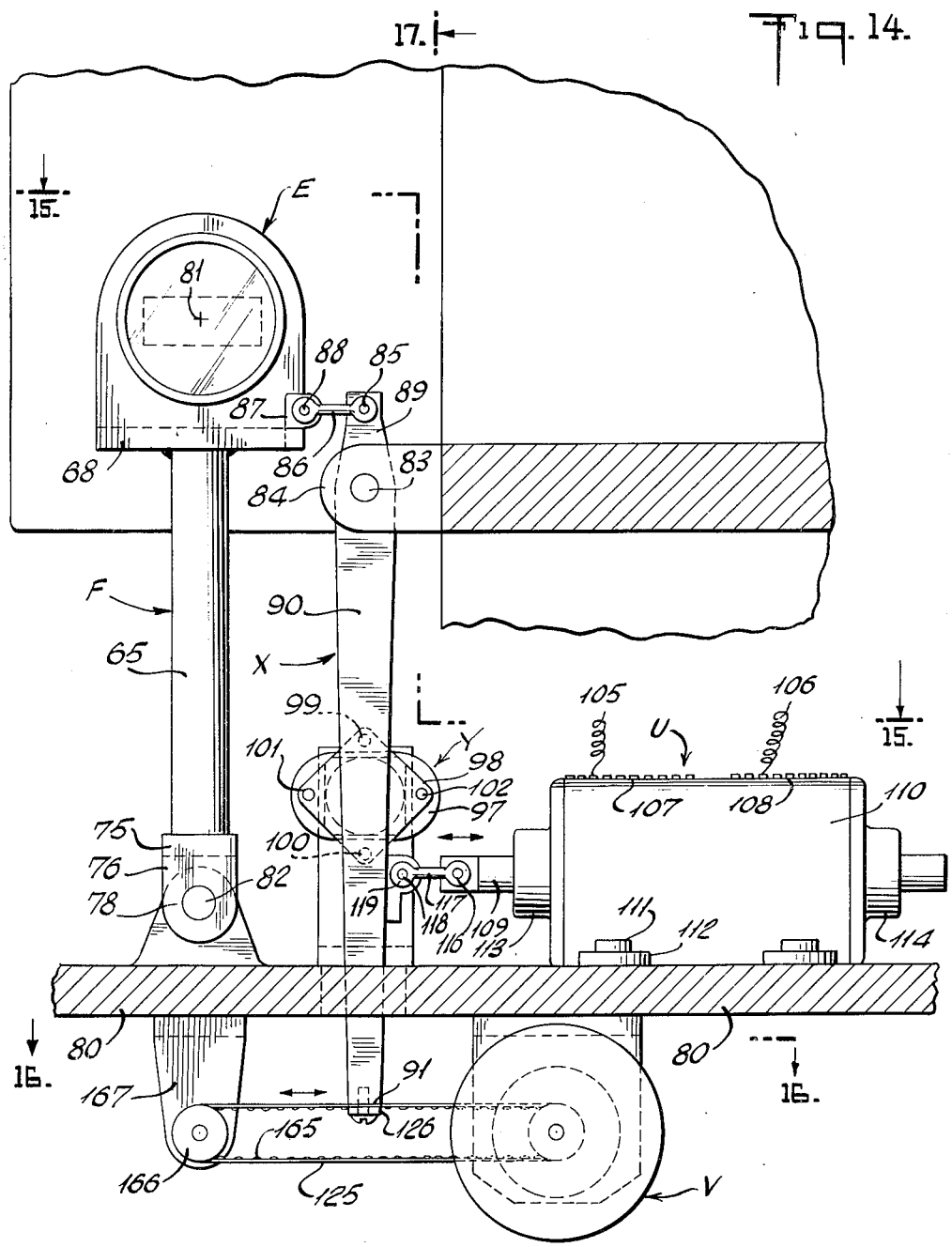

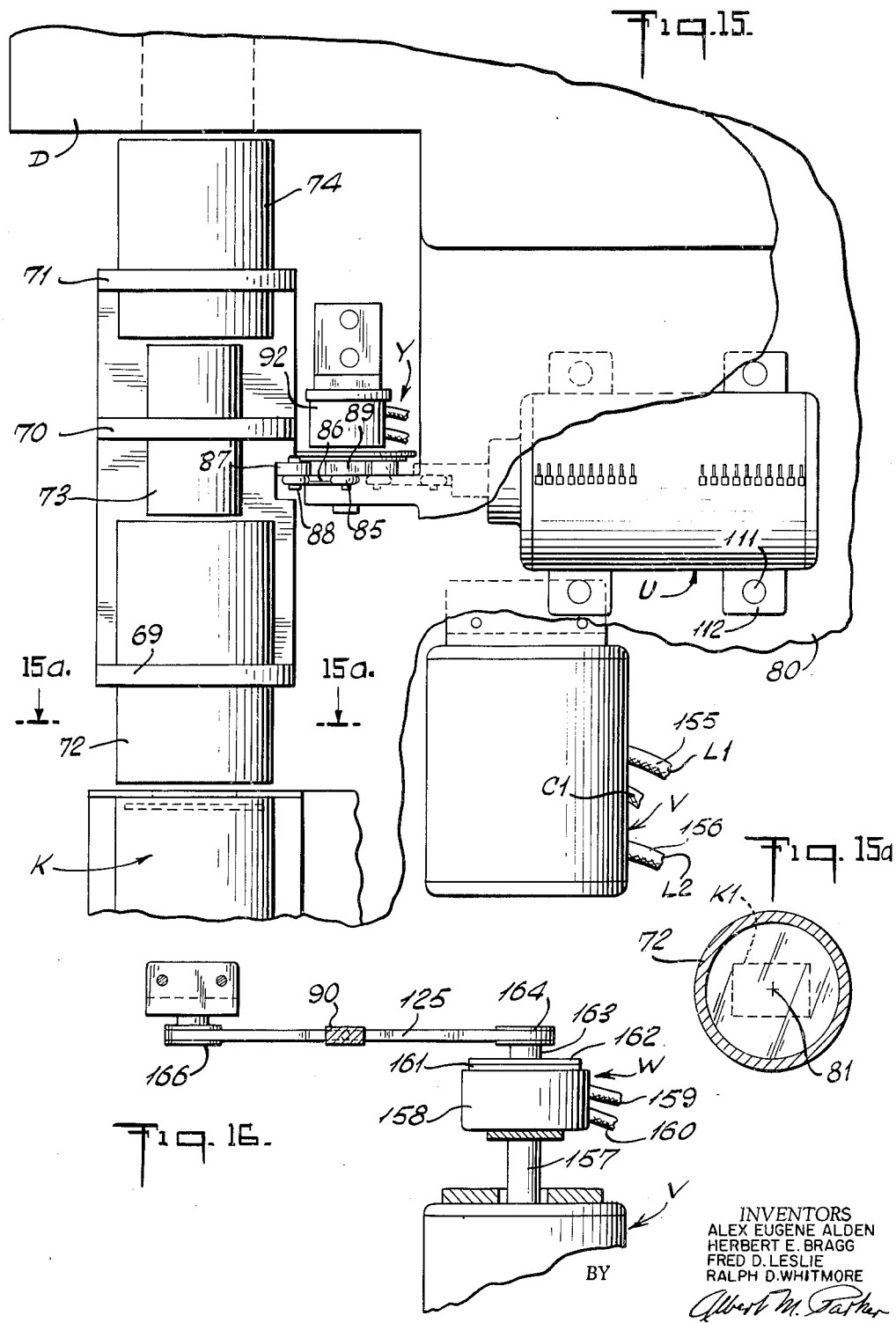

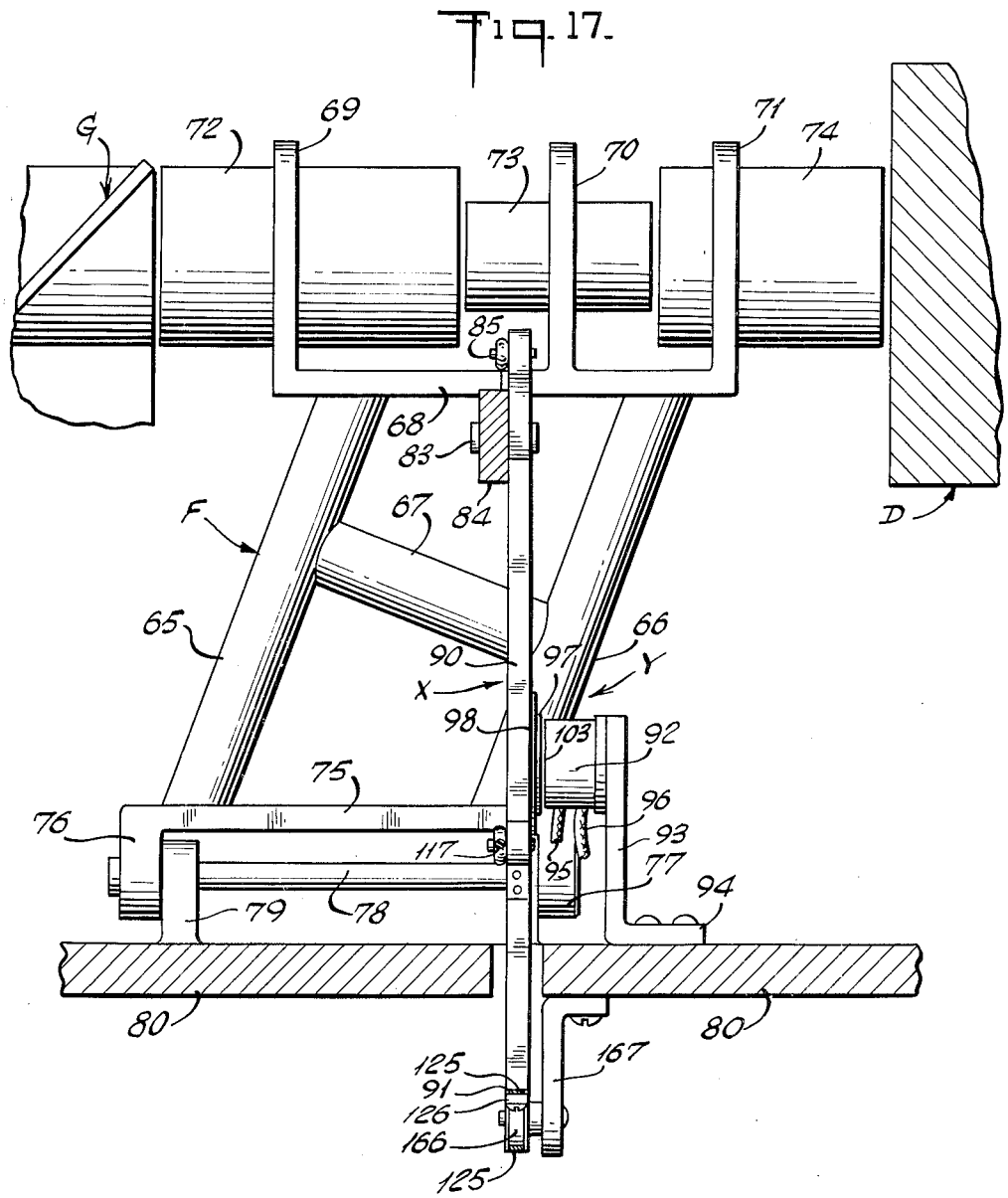

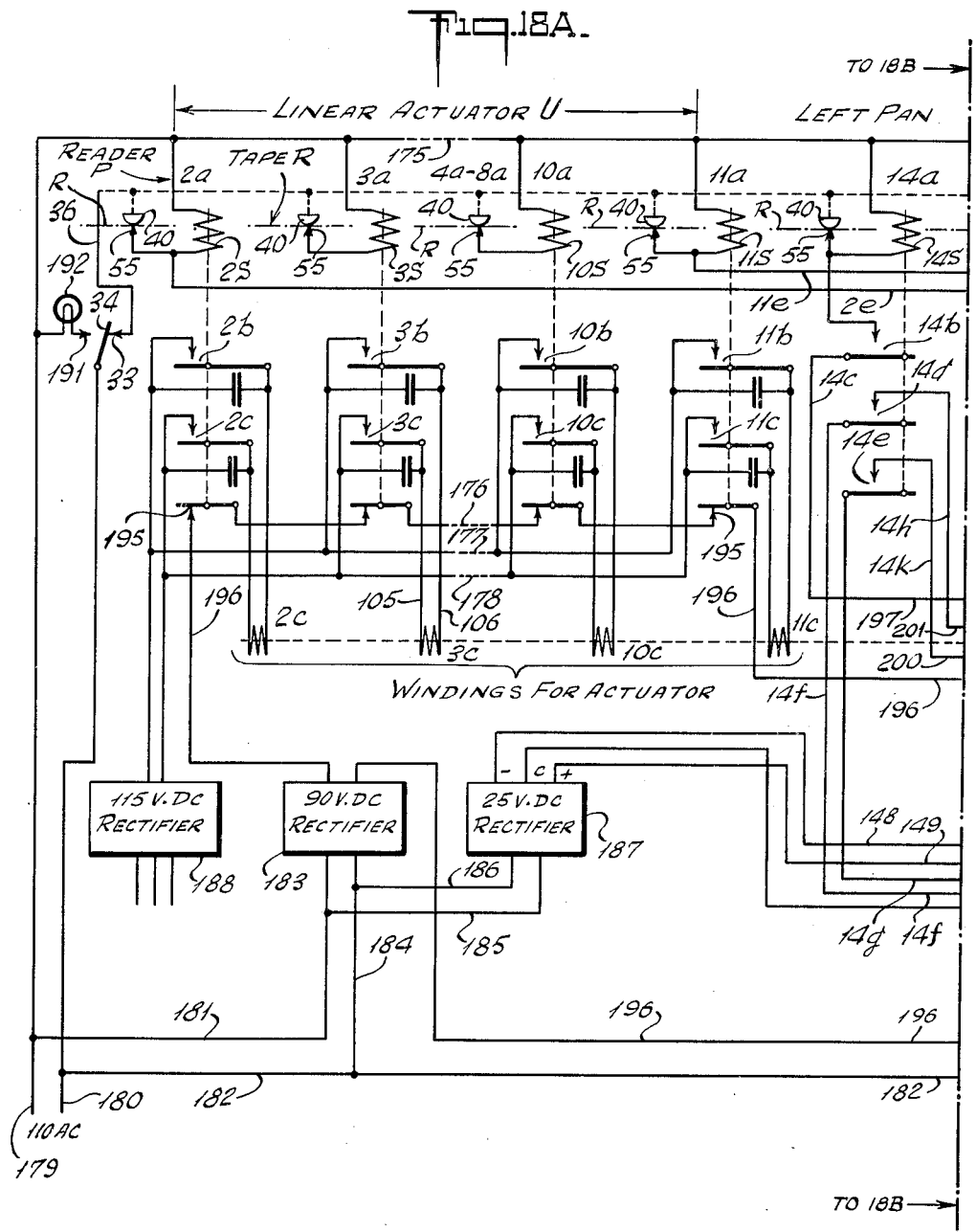

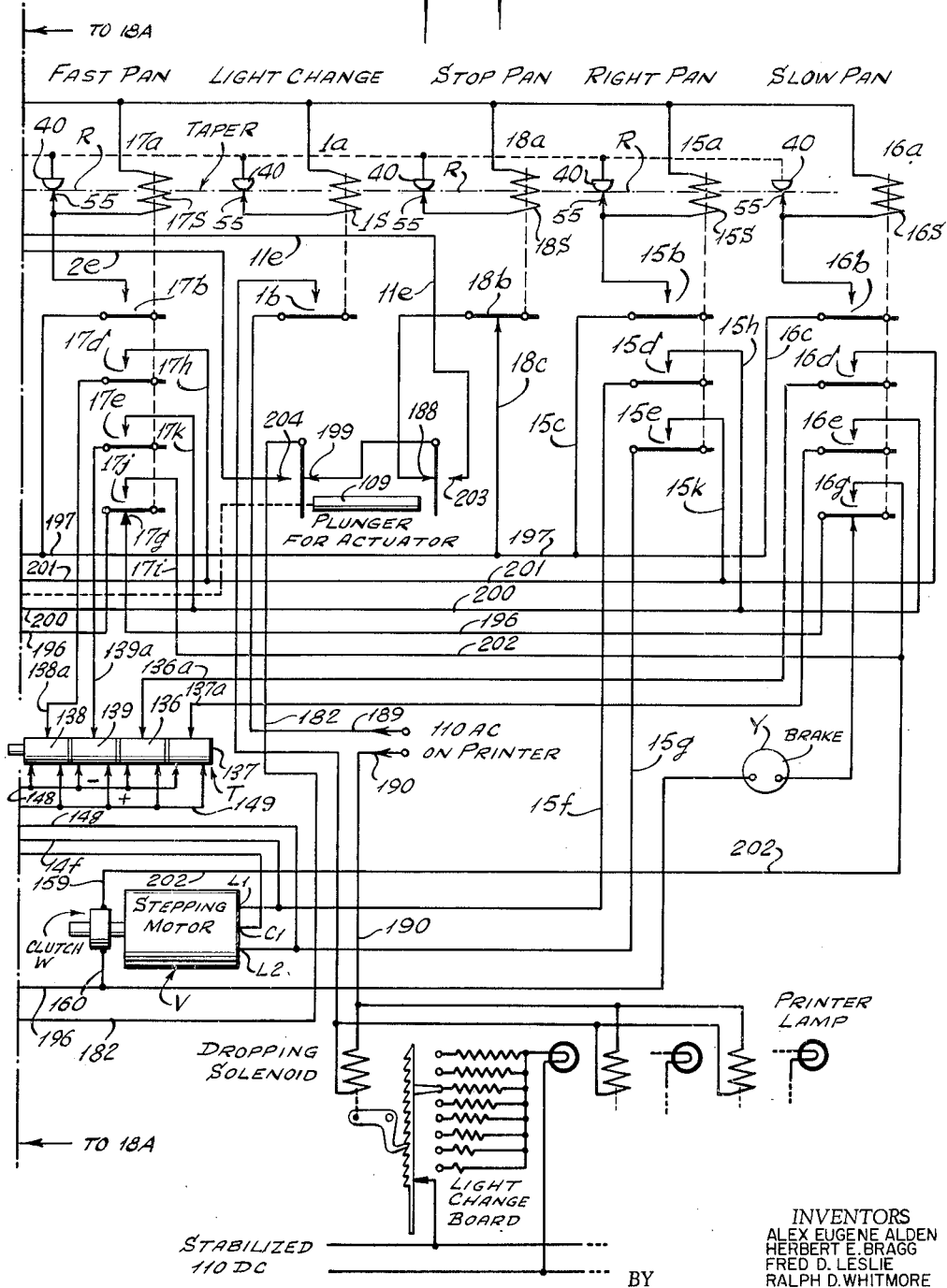

United States Patent Office 3,199,404
Patented Aug. 10, 1965

3,199,404
METHOD AND APPARATUS FOR AUTOMATICALLY AND REPETITIVELY MAKING COPIES OF PRESELECTED PORTIONS OF MOTION PICTURE FILMS
Herbert E. Bragg and Ralph D. Whitmore, New York, N.Y., Alex Eugene Alden, Stamford, Conn., and Fred D. Leslie, East Rochester, N.Y., assignors to Twentieth Century-Fox Film Corporation, New York, N.Y., a corporation of Delaware
Filed Sept. 21, 1962, Ser. No. 225,279
32 Claims. (Cl. 88—24)

This invention relates to optical means and methods for making copies or prints from motion picture films. It is particularly concerned with such means and methods for automatically and repetitively selecting a limited portion of the width of a scene, which as photographed is much wider than it is high, for portrayal on a screen where the width of the picture is, if anything, only slightly greater than the height thereof.

In the making of prints normally considered as positives from photographic negatives it is common practice to pass an already exposed negative and the positive to be printed upon through a printer. If the copy, or the positive, is to be of the same physical dimensions as the negative, then the two pieces of film can be placed in contact and a light beam passing through the negative and falling on the positive forms an image therein. On development and fixing of this image this positive becomes the finished print.

If the picture image on the print is to be of different size from that on the original, then the printing is done in an optical printer where the negative and positive are spaced apart rather than being in contact. Proper adjustment of the distance between the films and of the image forming lenses allows the operator to make prints carrying images either larger or smaller than the original as may be desired.

Commonly, however, optical printers reproduce on the positive film an image of the negative which includes substantially the entire negative image both horizontally and vertically, i.e. the reproduction on the positive is one in which there is no significant change in the ratio of the height of the picture to the width thereof. This ratio is commonly referred to as the "aspect ratio."

When, however, the aspect ratio of the negative and that desired on the print are markedly different, as in the case where the image recorded on the negative is, for instance, in accordance with an anamorphic, or other wide screen process, and the image to be recorded on the positive is to be of standard size, or rather has an aspect ratio of substantially 1.3, such as that of the so called "2-D" system, then the problem arises of selecting the limited portion of the negative image which best conveys the action and dramatic values of the original story for recording on the positive.

Consider more particularly a motion picture negative, or other film to be used for the making of copies, composed of many scenes containing a variety of subject matter each equally different from the preceding and succeeding scenes. Within each scene there may likewise be a pictorial content, such as the principal center of interest, which moves about from side to side at random, or contrariwise, there may be long intervals during which the center of interest remains stationary. Additionally, there may be more than one center of interest, as where two people converse with each other, one on one side of the screen or image and the other on the opposite side.

In the case of wide scene pictures in accordance with the "Cinemascope" system developed by the Twentieth-Century-Fox Film Corporation, which system is now commonly followed and has been for some years in the photographing and projecting of wide scene pictures, the width of the scene to be photographed is approximately 2.34 times the height thereof. Accordingly this is the shape of the picture presented on the screen except for relatively minor adjustments in individual moving picture theatres. If, however scenes in accordance with this aspect ratio are to be portrayed on a television screen for example, in which the width of the picture tube is only 1.3 times the height, a portion of the wide screen picture width must be omitted or the height of the picture showing on the television screen must be correspondingly reduced, resulting, in the latter case, in a large part of the television image area height being wasted.

A large number of moving pictures have been made and are continuing to be made where the scenes are wide in relationship to their height, as discussed in the foregoing, and there is a need for utilizing this material for making showings for television systems, or for the so-called 16 mm. home movies. Reproductions for these purposes have tremendous value when it is considered that otherwise, and at the outset, special photographing of the portions of wide scenes would have to be effected at an aspect ratio of 1.3 to make such material available for television and 16 mm. projection. Such special photographing would encumber the making of motion pictures to such an extent as to be economically out of the question.

This invention is, accordingly, concerned with a method and apparaus for producing an image in the unexposed motion picture film placed on the aperture of the camera side of a printer in accordance with the preselection of the portion of the wide scene negative field which it is desired to use. Basically this is done by causing the optical axis of the lens of an optical printer to move across the field of the wide scene negative laterally in accordance with the preselected pattern made up from a viewing of the entire picture area.

It is a most difficult matter, however, to provide satisfactory means for moving the lenses laterally without permitting the slightest motion or vibration, since either of those would ruin the definition in the print. It is known from the art of lathes and other machines to provide lateral movement by means of accurately machined slides or ways, or gibs, but they are inherently slow moving, while in this instance the lens axis in the extreme condition must travel from one side of the negative film to the other during the short period of time in which the shutter of the recording camera is closed. It has been found, however, and is the subject of this invention, that the lens elements may be moved in the manner desired when mounted in rigid axial alignment on a bridge-like structure, which structure is supported on and moved about pivots on a long radius arm. The structure is kept as light in weight as possible and since the travel distance is small, relative to the radius, the vertical rise of the lens axis is insignificant.

Having determined that the way to provide the needed motion is by means of the pivoted bridge-like construction just referred to, the next problem to be overcome is how to effect the movement of the lens system for selection of the portion of the image from a wide scene negative to be printed on a positive for television use, or for ordinary 35 mm. or 16 mm. projection. To be economical this must be done automatically and at a relatively high rate of speed. The mechanism must provide for moving the lens system laterally from one scene to the next when the action of a subsequent scene selected for printing is similarly laterally spaced across the wide field recorded on the negative. Then mechanism is needed that effects movement of the lens system for panning, either to the left or the right, and either at a slow or fast speed. This mechanism must also include provision for stopping the panning action.

In addition to the provisions for the movements just referred to, the system must include means for absoutely preventing any movement of the lens system when the shutter is open. The scene shift or panning actuating means can only go into operation when the shutter is closed.

The invention includes a solution to all these problems and does so in a manner that a fully automatic printer results. The lens system of this printer acts as an optical lever to record images out of the lateral preselected portions of wide scene recordings. It does so by projecting the whole of the wide scene recorded and centering the desired portion on the camera aperture, eliminating the unwanted area through the masking effect of the camera aperture. The positives produced have an aspect ratio of substantially 1.3, usable in theatres having narrow screens, for television, or for home movies, or a negative can be made if the film printed from is a positive.

The method of the invention commences with the viewing of the wide scene recording by an individual skilled in this type of work. While carrying out that viewing the operator makes up a control tape, punching or otherwise altering the condition of such tape so that it can thereafter be used for completely and automatically controlling the operation of a printer designed in accordance with the invention to print motion picture images of the aspect ratio desired. Such control tape is moved in synchronism with the movement of the printer, though normally at a slower speed than that of the printer, and its control elements effect the scene changes as the printing proceeds, as well as effecting all the various aspects of the necessary panning, while in between times preventing the operation of the means which unlocks the means mounting the lens system to enable it to be moved for such shifting of scenes or panning.

Finally it is to be noted that the printing of motion picture images in accordance with the invention can, of course, be effected whether the starting point be black and white or be three color records where those colors are brought together in customary manner in the printer.

It is, accordingly, a principal object of this invention to provide a method for automatically and repetitively printing motion picture films in accordance with preselected portions of wide scene motion picture films which it is desired to use.

Another object is to provide apparatus for economically and repetitively carrying out such method.

Another object is to provide such method and apparatus without introducing any distortions into the prints being made.

Still another object is to provide apparatus and for the carrying out of such method which can be incorporated in otherwise standard optical printers now available on the market.

A further object is to provide apparatus and for carrying out the method of the invention which is coordinated with the operation of standard optical printers in such a way as to be adaptable to operate in conjunction with the operation of the printer.

A more specific object is to provide repetitive preselections of the portions of a wide scene image to be printed to take place during the time that the exposure of the film being printed upon is blocked out by the presence of the shutter.

Another specific object is to provide for positive prevention of any action of the selection responsive means while the stock being printed upon is exposed.

Further and more detailed objects will in part be obvious and in part be pointed out as the description of the invention taken in conjunction with the accompanying drawing proceeds.

In that drawing:

FIG. 1 is a side elevation of so much of a standard optical printer as is needed to be shown for an understanding of the invention and showing the lens system moving and other features of the invention applied thereto.

FIG. 2 is a front elevational view and FIG. 3 is a side elevational view of the tape perforator showing a section of the control tape passing therethrough.

FIG. 4 is a greatly enlarged elevational view of a representative section of control tape after having been punched by utilizing the perforator of FIGS. 2 and 3.

FIG. 5 is a top plan view of the reader attached to the printer through which the control tape passes with a section of such tape being shown as passing therethrough.

FIG. 6 is a vertical section taken on line 6—6 of FIG. 5.

FIG. 7 is a horizontal section taken on line 7—7 of FIG. 6 and looking in the direction of the arrows.

FIG. 8 is a vertical section taken on line 8—8 of FIG. 6 and looking in the direction of the arrows.

FIG. 9 is a fragmentary vertical section taken on line 9—9 of FIG. 6 and looking in the direction of the arrows.

FIG. 10 is a fragmentary sectional view of a portion of the showing of FIG. 9, but showing the roller of the shut-off device raised by the tape to render that device inoperative.

FIG. 11 is a diagrammatic showing of means for driving the reader and commutator in synchronism with the printer motor.

FIG. 12 is a longitudinal vertical section of a commutator employed for effecting the changes needed in panning.

FIG. 13 is a vertical section taken on line 13—13 of FIG. 12 and looking in the direction of the arrows.

FIG. 14 is an enlarged elevational view of the mechanism for mounting and moving the lens system across the light beam for selecting the desired portion of the originally recorded area.

FIG. 15 is a section taken on line 15—15 of FIG. 14 and looking in the direction of the arrows.

FIG. 15a is a section taken on line 15a—15a of FIG. 15 and looking in the direction of the arrows.

FIG. 16 is a section taken on line 16—16 of FIG. 14 and looking in the direction of the arrows.

FIG. 17 is a vertical section taken on line 17—17 of FIG. 14 and looking in the direction of the arrows.

FIG. 18 is a wiring diagram showing the circuitry involved in the operation of the apparatus and being spread over two sheets is made up of FIG. 18A covering the left hand portion of the diagram and FIG. 18B covering the right hand portion thereof.

For the purposes of exmplification, the method and apparatus of the invention are shown in the accompanying drawing and described in the text to follow as embodying the printing on standard size film from anamorphic material thus involving decompression. It is to be understood, however, that the invention is not to be considered as being limited by this example inasmuch as it is applicable to the making of prints where various changes in aspect ratio are involved and whether or not a decompression element is needed.

In FIG. 1 the apparatus of the invention is shown as applied to a well known Acme Optical printer as produced by the Acme Camera Corporation of Burbank, California. This printer has a main frame, generally indicated at 1, and, as shown, it is set up for making prints from films in three different colors of the same subject. Accordingly, the printer is equipped with three pairs of reels, A—A, B—B, and C—C. The film A1 passing from one to the other of the reels A—A is fed through its printing gate A2 while light from the lamphouse A3 passes through it. Likewise, the film B1 from the reels B—B passes through the printing gauge B2 where light from the lamphouse B3 passes through the film and the same is also true with respect to the film C1 passing through the gate C2 and being traversed at that position by light from the lamphouse C3. The brightness of each color is controlled by the control of its own light through its own light board as is usual in color printing so need not be detailed here as it is of no particular significance in the instant invention. Likewise the three beams of light after having passed through their respective films are combined through prisms in the housing D into a single beam of light for passing through the movable decompression and selector lens system. This selector lens system, generally indicated at E, is carried by a pivoted bracket generally indicated at F, for swingable movement transversely of the housing E. The bracket F and the mounting and moving of it are essential features of this invention.

Beyond the lens system E a beam splitter, generally indicated at G, splits the beam in two directions, one part to the 35 mm. copying camera, generally indicated at K, and the other part to the 16 mm. one generally indicated at N, which cameras are equipped respectively with film magazines H and J. Suitable optical and film feeding means, well known in the art, are mounted in the camera K so that film for the camera K from the magazine H is exposed to one of the beams of light while the other beam of light is reflected by the mirror L to pass through the lens M and be directed onto film in the camera N by suitable means therein. Each of the cameras K and N have a semi-circular shutter therein rotatable in synchronism with the feeding of the film so that the light is cut off while the film being printed upon is moved in the course of its intermittent passage through the film gate.

It will accordingly be seen that two films, one 35 mm. and the other 16 mm. can be printed simultaneously if desired by use of this apparatus. However, the making of multiple prints in optical printers is not per se novel so need not be gone into further here.

Another essential element of the invention is the reader, generally indicated at P, mounted on the printer housing beneath the camera N. This reader, responsive to the control tape passing through it, effects the preselection of the portions of the wide scene negative film to be printed on the positive. This reader and its tape R will be described in more detail in the text to follow. Likewise the following pieces of apparatus, assembled on the printer but not shown on FIG. 1, will be hereinafter detailed and the relationship of them to one another and to the features shown in FIG. 1, in order to achieve the automatically controlled selective printing of the invention, will be discussed:

The commutator to provide timed impulses for controlling the action of the motor effecting panning shown at T in FIG. 12;

The "Tronic" linear actuator or stepped solenoid shown at U in FIGS. 14 and 15;

The motor V of the "Slosyn" type, whose movement is controlled by the commutator T shown in FIGS. 12 and 13, with the electric clutch W for the motor being shown in FIG. 16;

The rockerbar X and the magnetic brake Y for holding it in position immovably are shown in FIGS. 14, 17, and to a certain extent in FIG. 15.

Considering now the tape perforator S and the part that it plays in the method of the invention, the perforator is shown in FIG. 2 as attached to the right side of a film editor Z, only a fragment of which is shown inasmuch as any commercial editor can be used with necessary modifications. The principal modifications consists of an indicator carrying two vertical wires spaced apart the width of the picture that will appear within the standard 1.3 aspect ratio on the screen. This indicator is mounted in a cross slide, just back of the film aperture of the editor, and it can be moved across the aperture by rack and pinion to any one of the ten positions which the operator may wish to select and be held in position by a ball detent. The location of these positions by number is shown on the selector dial. The editor is also fitted with a footage counter so that the operator can note where a pan begins and how long it runs. From a table he can select the proper of the two panning speeds and determine where to begin the pan and where to end it.

First, the operator, who is a person skilled in this work, runs through a scene while viewing it to see what is in it before he does any punching of the tape. Then he runs the film and the tape back to the beginning of the scene and presses the light change key 1. Then, by reference to the selector dial, the operator moves the framing device and sets it at the section of the film frame he prefers. Following that, the depresses one of the keys 2–11, numbered in correspondence with the number on the dial. These keys, and in fact all the keys, as shown in FIGS. 2 and 3, extend up above the face plate 12 of the perforator and though as shown they are not in any particular order with respect to position across the tape R, they nevertheless link up with devices which effect the punching at such positions. Each of the sixteen keys as shown on the perforator locks down when depressed, so that the operator can check his selection before pulling the punching lever 13.

Assuming then that the operator has pressed down key 6 and has checked his selection and found that he is satisfied with it, he then punches a hole in the control tape by pulling the punching lever 13. The key and its punch snap back to normal position as the punching lever is released. Here the hole punched is indicated at 6' in FIG. 4 which figure shows, by means of the punch numbers primed, the size and position of representative holes as they will appear in the tape in response to punching by means of particular punch and lever action. Also it is to be noted that the hole 6' is circular and smaller than the holes 2', 9', 3', 10', 4' and 11', while the remaining holes are the same size as the hole 6'. The reason for this is that the various holes are to enable electrical contact to be made through the tape to control the action of the step solenoid which in turn swings the selector lens on its bracket. If the solenoid is to be moved to one of its outer positions for moving the lens system to the desired position the electrical contact will have to be longer than for a short movement. Hence the longer and shorter holes.

The editor then runs the film ahead to the beginning of a pan, whereupon he presses key 14 for left pan or key 15 for a right pan, and, in addition, he depresses key 16 if the pan is to be slow, or 17 if it is to be fast. Having done this he actuates the punch lever 13 and runs the film ahead to the point where the pan should stop. Then he depresses the stop pan key 18 and again actuates the lever 13 to punch the desired hole in the tape. All of the holes for panning are the same size because the pan relays are locked in and panning continues step by step in synchronism with shutter closings until the relay is released by the stop pan contact.

The holes 19 along the right hand side of the tape R are merely sprocket holes by which the tape is driven by sprocket 20, best seen in FIG. 3, while the tape is held against that sprocket by rollers 21 and 22. The sprocket 20 is driven in synchronism with the movement of the film by suitable drive taken from the film drive mechanism and imparted to the gear 23 mounted on the shaft 24 to turn the same. At this point it is to be noted that the tape R runs at only one-eighth of the speed of the film. Also the positions of the holes in FIG. 4 are purely for the purpose of showing their sizes and their sidewise spacing across the tape and are not necessarily an indication of any particular pattern that would prevail in practice. Assume now that a control tape R has been punched for a reel of wide scene film, and is now to be used for effecting and controlling the movement of the pivoted bracket carrying the selector decompression lens system so as to print positives in accordance with the preselected portion of the compressed negative to be made into positive prints. In order to do this the film, whether three color or black and white record, is mounted in the appropriate ones of the pairs A—A, B—B, and C—C of film reels, while the 35 mm. and 16 mm. films to be exposed are carried in the appropriate magazines H and J for the cameras K and N. It is, of course, to be understood that the negative films from which the prints are made and the positives which are printed therefrom would be moved in synchronism and at the same speed while the printing takes place.

The semi-circular disc shutters in the cameras K and N will be in closed position across the aperture during the time the movement takes place. By the same token, movement of the pivoted bracket for transversing the selector lens system across the negative film must all be done while the film is being moved and the light path is shut off by the shutters. Thus the mechanism for moving the bracket has to be exactly synchronized with the drive mechanism for the printer.

THE READER

The first step in effecting exact synchronism is to have the reader P, FIGS. 1, 5, 6, 9, 10 and 11, driven from a common shaft 25 taken from the printer drive and driving the reader through suitable gearing. Insofar as movement of the tape through the reader is concerned, however, the gearing is such that the tape R, though running at a constant speed in synchronism with the constant speed sprockets of the film feeding mechanism, runs at only one-eighth the speed of the printer. Thus 125 feet of tape matches a full 1000 feet of film on a reel. About the fastest speed at which the printer can be run, while alowing at least 1/25 of a second for the mechanisms to make the adjustments of positions of the selector lens across the film, is from 12 to 15 feet per minute. At its entrant end the reader frame has a support 26 which supports a pair of vertically spaced idler rollers 27 and 28. The tape coming into the reader, first passes around the idler roller 27 and then up around the roller 28. Here it is important to note that the roller 28 is inwardly grooved at 29 at substantially its mid-position. A small roller 30 positioned above the roller 28 and aligned with the groove 29 is carried by an angle bracket 31 which is pivoted at 32 so as to enable the roller 30 to ride upwardly and downwardly with respect to the groove 29. The upper extension 33 of the bracket 31 serves as a contact member for the opening and closing of a circuit depending upon its position with respect to the contact 34 carried by a transverse supporting member 35. The member 34 may be merely an actuator with the real switch being inside of the housing 34a in which event the members 33 and 34 would be secured together.

As will be seen by considering the showing in FIG. 6, wherein the path of the tape R, but not the tape itself, is shown in dot-dash lines, in conjunction with that in FIGS. 9 and 10, the formation of the angle bracket 31 and the mounting of the same is such that when the tape R is in position overlying the roller 28 (FIG. 10), the small roller 30 rides on that tape instead of dropping into the groove 29. While the roller 30 is so supported the contact end 33 of the bracket 31 is maintained in contact with the contact member 34 thus maintaining the circuit for the operation of the printer closed. When, however, the tape R runs out, or if it should break, the roller 30 will fall into the groove 29 (FIGS. 6 and 9), and in so doing will move the arm 33 away from the contact 34. This stops the printer, by tripping the circuit breaker on the main supply and at the same time stops the operation of the various controls provided by the invention. The leads from the switch elements 33, 34, to the main printer circuit are shown at 36, 37.

The transverse member 35 on which the bracket 31 and the contact housing 34a are mounted is preferably formed of an insulation material, of which Bakelite is a non-limiting example. This member extends down to a rounded nosing portion 40 in the form of a common contact bar extending all the way across the reader so as to overlie all of the portion of the tape R which may have control holes punched therein. The bottom of the bar 40 presents a smoothly rounded downwardly convex surface 41 over which the tape rides and the bar 40 is preferably made of silver, due to the physical characteristics and good electrical conductivity of that metal.

As it leaves the rounded surface 41 the tape R extends upwardly, as best seen in FIG. 6, and passes over the drive sprocket 42, whose teeth 43 engage with the perforations 19 of the tape and draw it through the reader. The sprocket 42 is carried by a shaft 44 which, exteriorly of the reader frame, has a bevel gear 45 secured to it in engagement with the bevel gear 46 engaged with the drive shaft 25. Thus the sprocket 42 is driven directly from the drive of the printer and, as already pointed out, the arrangement is such that its speed is one-eighth that of the printer.

A pair of idler rollers 47 and 48 are mounted in frame members 49 and 50 at opposite sides of the reader and hold the tape in engagement with the sprocket 42, being recessed at 51 and 52 so that the sprocket teeth may extend up into them. Advantageously the rollers 47 and 48 may be carried by latch mechanism whereby they can be moved away from the sprocket 42 in order to enable the tape to be fed over the sprocket. Such latch mechanism is well known in the art.

As the tape leaves the roller 48 it passes over another idler roller 53 mounted on the frame member 54 at the opposite side of the reader. From there the tape R is suitably wound up ready for reuse.

The so-called "reading" aspect of the reader results from the provision of the 16 spring contact fingers positioned along in a row in alignment with and beneath the surface 41 of the bar 40. They extend across in engagement with the undersurface of the tape R and make contact with the surface 41 when a perforation in the tape R corresponding to the position of one of the fingers passes the position where one of the fingers and the surface 41 are opposed. These fingers are all alike, so as seen in FIGS. 6, 7 and 8 are all given the reference character 55. They extend up through a transverse slot 56 in an insulating block 57 which, as best seen in FIG. 7, extends across the printer and is carried by a frame portion 58. Each of the fingers 55 is integral with and is carried by a horizontally extending spring arm 59, the remote ends of which are fixedly mounted in another transverse block 60 of insulating material mounted on the base 61.

At their ends remote from the fingers 55 the arms 59 are provided with contact tails 62, here shown as alternately staggered. These tails are joined up by suitable wiring with the particular part of the control apparatus to be energized in response to the closing of the circuit between the particular one of the fingers 55 and the contact bar 40. The other end of the circuit will, of course, lead from the contact bar 40.

It is believed that the operation of the reader will be apparent from the foregoing description of its construction. As the tape R is drawn past the rounded surface 41 by the action of the sprocket 42 it is held tightly against that surface while the fingers 55 ride on the undersurface of the tape. The fingers 55 are spring pressed and highly sensitive so that they will not injure the unperforated portion of the tape but will fall into any perforations that come along in alignment with them, immediately make contact with the bar 40 through the perforations and then ride back out of the perforation as the feed of the tape continues. Thus circuits can be closed providing for the changing of scene position, panning right or left and at slow or fast speed, stopping the panning and making light changes. The mechanism which is actuated through these 16 circuits will now be described.

THE LENS SUPPORTING BRACKET

Considering next the pivoted bracket F for carrying the decompression and selection lens system across the light beam, and the elements directly connected thereto for moving the same, the bracket F for adequate strength consonant with keeping weight down to a minimum is in the form of a tubular frame. This frame has legs 65 and 66 (FIGS. 1 and 17) joined together by another tubular crosspiece 67 at about the midpoint of the frame. For weight purposes the tubing making up the frame is preferably made of magnesium or of a light magnesium alloy.

The upper ends of the legs 65 and 66 of the frame F are secured to the base 68 of the lens carrier. This carrier is provided with a series of upstanding clamping yokes 69, 70 and 71, which tightly clamp the lens elements 72, 73 and 74 therewithin and cause those lens elements to move with the movement of the bracket F.

At its bottom end the frame F has its legs 65 and 66 secured to the top 75 of a pivotal mounting yoke whose ends 76 and 77 extend downwardly and are swingably mounted on the ends of an axle 78 carried by support 79 extending upwardly from a substantial base member 80 solidly secured to the frame of the printer.

Swinging movement of the frame F needs to be as friction-free as possible, as here shown the mounting of the ends 76 and 77 on the shaft 78 is effected by means of ball bearings. Alternately, means such as pin pivot bearings between the members 76 and 77 and the ends of the shaft 78 can be provided. It is thus apparent that the frame F swings easily and without any lag involved in the movement of sliding members.

With regard to the possibility of distortions being introduced into the printing of the positives by means of the arcuate swing of the lens elements, this is not a factor of any consequence. The reason for this is that the radius of movement of the lens axis between that axis 81 and the center 82 of the turning shaft 78 in the apparatus as here illustrated is 12", while the arc through which the axis of the lens has to move is less than ¼" from the center line in either direction. Thus neither the vertical movement of the lens center nor the rocking of the picture due to the inclination of the axis of the frame F from the vertical are of any consequence.

The lens elements employed in the lens system here are somewhat wider than would normally be employed while element 73 is the anamorphic lens which decompresses the wide scene compressed laterally on the negative. Perfection of reproduction is achieved by the use of wide lenses for, though the lenses move across the whole of the scene on the negative, and decompress it as seen in FIG. 14, they center on the portion preselected. They project the whole of the wide scene onto the front wall of the camera but the preselected portion is the only portion admitted through the camera aperture, as seen at K1 in FIG. 15a. The remainder of the scene projected is masked off by the front wall of the camera K or N as the case may be.

Movement of the lens mount on its bracket F as may be required by changes in scene position, as well as movement involved in panning are achieved through the action of the rockerbar X. This rockerbar is pivoted on a shaft 83 extending horizontally between supports carried by the machine frame. This pivotal position is closely adjacent the position 85 where the rockerbar is linked by means of the link member 86 to the tongue 87 extending up and out from the base of the lens mount 68, which linking is indicated at 88. Contrasting the length of this short upper portion 89 of the rockerbar with the length of the lower portion 90 thereof from the shaft 83 to the bottom end 91 of the rockerbar, it will be seen that the movement imparted to the short lever arm 89 and by means of it to the lens carrier 68, will be very small in comparision to the movement of the longer lever arm 90. Such a short movement can be quickly effected and quickly stopped.

THE ELECTRIC BRAKE

As pointed out earlier, unless the rockerbar X is being actuated to move the lens system for the changing of a scene, or for panning, it must be held in fixed position, for unless the power is on the moving means they are free to move idly and would not impart any particular drag on movement of the rockerbar should some motion of the apparatus tend to cause that. On the other hand, there should be provision for instantaneous unlocking of the rockerbar when there is need to move it by either of the moving mechanisms. This locking and unlocking is well taken care of by means of the electric brake indicated at Y.

The brake Y has its coil portion 92 mounted on a bracket 93 which in turn is fixedly secured at 94 to the substantial base portion 80 of the structure. Leads 95 and 96 provide current for the brake which, as already indicated, is normally on. The armature 97 of the brake is mounted on one face of the portion of the rockerbar 90 by means of a spring plate 98. The spring plate 98, as best seen in FIG. 14, is secured at upper and lower positions 99 and 100 to the rockerbar portion 90 and is secured at transverse portions 101 and 102 to the armature 97. Thus when the brake is actuated, the armature 97 is drawn into contact with the opposed face 103 of the coil element 92 against the spring action of the plate 98 and is held there tightly so long as the current remains on, thus holding the rockerbar immovable. When the current is shut off, however, the spring plate pulls the armature quickly out of contact with the face 103.

THE LINEAR ACTUATOR

If it be assumed that a control tape is being fed through the reader and one of the contact fingers 55 makes contact through a perforation in the tape punched to indicate a scene change, the electrical system would go into operation, the shutter action having been synchronized with the movement of the tape at the outset, and the brake Y would be released. Simultaneously therewith the linear actuator U would go into operation through current imparted to it by a pair such as 105 and 106 of leads responding to the circuit closed by the perforation in the control tape enabling the finger 55 to engage the common bar 40 (see FIG. 6). There will be leads 105 for each one of the ten contacts of one set 107 of the linear actuator, and a similar set of ten leads 106 for each one of the set of contacts 108 of the linear actuator (FIG. 14). This device, designated as a "Tronic" unit and manufactured by the Tronics Corporation of Minneapolis, Minn., is in a sense a stepping solenoid having as the operating member a plunger 109 which can be actuated to move in reverse directions. As is indicated by the sets of contacts 107 and 108 there are 10 positions to which it can be moved, the positioning is accurate, the pull is substantial and the movement is fast, with a total travel of 1.5". Current must not, however, be held on the actuator after the plunger has been repositioned.

Though two sets of ten contacts 107 and 108 are shown on the actuator U, it will be obvious that there are nine movements which the plunger 109 can make to move it to ten positions since it starts at one of them. Thus recalling that the total travel of the plunger is 1½" and dividing this by 9, it will be seen that each step using this particular actuator will be .167". This translated through the linkage provided gives the movement needed of the lever arm 90 of the rockerbar to move the lens mount the shortest step. However, no matter the size of the step, the plunger moves far enough and fast enough to effect the whole of it during one closing of the shutter.

The linear actuator U accordingly has a housing 110 containing the coils to which the leads 105 and 106 are directed. This housing is securely mounted on the base 80 carrying various other elements previously described, such mounting being by means of hold down bolts 111 passing through wings 112 extending out laterally from the sides of the housing.

The ends of the housing are provided at 113 and 114 with substantial bushings for accurate movement of the plunger 109 in either direction. At its inner end the plunger is linked at 116 to a link member 117, which in turn is linked at 118 to a projection 119 extending out from the adjacent side of the rockerbar X. Thus movement of the plunger 109 in respnse to the closing of the appropriate circuit moves the rockerbar to the right or left, as seen in FIG. 14, dependent upon the direction and extent of movement called for by the circuit that is closed. The plunger can move from any position to any other in a single step. First, of course, the brake Y has to be released as already pointed out.

The plunger 109 is perfectly free to move and be moved when the circuits to the actuator are open and so long as the brake Y is off. Thus the belt 125 to which the bottom end 91 of the rockerbar is clamped, as shown at 126, can move that rockerbar for panning purposes which take place at times other than those utilized for scene movements.

MOVEMENT FOR PANNING

Referring now to FIGS. 12, 14, 15 and 16, the stepping motor V and the instrumentalities which control its operation and by which it effects panning will be described. The motor V is a motor with double windings and it can be made to move in either direction in response to the flow of direct current of positive or negative characteristics as will appear hereinafter. Due to its two windings the motor has a common lead and two side leads. The armature of the motor is caused to move in discrete steps when the polarity of the voltage applied to the two outside leads is varied in a definite sequence. The direction in which it will advance depends on the order in which the sequence of the voltage polarity is arranged. The commutator T and relays in the electrical system serve to apply the voltage of different polarities to the motor in a way to make it take either one or two steps for each closing of the camera shutter for slow or fast panning either in a left to right, or a right to left direction.

The commutator T is shown per se in FIGS. 12 and 13. It has a main shaft 128 passing through the housing 129 mounted therein for rotation in bearings in the vertical end members 130 and 131 of a frame whose horizontal top member is shown at 132. Where it extends out at the left hand end of the housing 129 the shaft 128 carries a bevel gear 133 secured to it to rotate with it. This bevel gear is, for illustrative purposes in this situation, shown as in driving contact with the bevel gear 46 secured to rotate on the end of the shaft 25, which shaft is driven directly from the printer motor. Thus the commutator shaft 128 is driven in synchronism with the printer drive.

A sleeve of insulating material, of which Bakelite is a good example, 134, is mounted over the shaft 118 and is pinned thereto to rotate therewith as indicated at 135. This sleeve may be made in two sections in order to facilitate assembly, but that is of no particular significance. There are two sets of contact members one set mounted on each sleeve section 134 to rotate therewith. Each set consists of an identical pair of members with the contact means of the first pair 136 and 137 being made to provide one impulse to the motor per revolution of the commutator while those of the second pair 138 and 139 provide two impulses per revolution. Each of the members 136 and 137 of the first set may be considered as opposed sections of tubing of good conducting metal having cylindrical base portions 140, each of which has a signle contact segment 141 somewhat less than half the circumference of the cylinder extending outwardly therefrom. The contact segments 141 of each pair extend in opposed relationship toward the opposite bases and they are uniformly spaced from each other circumferentially and with the end of each segment being insulated at 142 between its end and the opposite base.

What is important to note however is that the contact segments 141 of the pair 136 are turned circumferentially somewhat less than 90% with respect to the segments 141 of the pair 137. This provides for different polarity patterns being imparted to the motor as the commutator rotates and effects the reversal of rotation of the motor depending upon the manner in which the leads to the motor are controlled by the right and left pan relays.

The contacts of the pairs of the second set 138 and 139 likewise have cylindrical bases 143 from which segments of cylinders extend in opposed relationship as seen at 144. In this instance, however, there are two segments 144 extending from each base with each of the segments being less than one-quarter of the circumference of the cylinder. Also the contact segments 144 of the pair 139 are circumferentially rotated a little less than 45° with respect to the contacts of the first set for controlling the polarity pattern to the motor for fast panning. Again relays in the circuit acting through the commutator can reverse the rotation.

Each of the contact members 136, 137, 138 and 139 has 3 longituditudinally spaced brushes riding on it. These are spring pressed and are seated by means of the screws 146 mounted in the support member 132.

A sectional terminal strip 151 provides the lead connections for wiring to the brushes 145. As seen in FIG. 12 this strip known as a "Parker Terminal Strip" has insulated lead sections along its length, one for each brush. For the members 136 and 137 the center leads 136a and 137a take off the current to the relay system and through that to the motor V going directly for rotation in one direction to and being crossed over for reverse rotation. The side leads 148 and 149 feed positive and negative current respectively to the members 136 and 137 at their continuous end rings so that it is alternately taken off by the center leads 136a and 137a as the commutator rotates.

The construction and relationship of each of the sets of three contact brushes for both single and double impulse operation are the same, so the description of them need not be repeated. The only difference in operation is that the contacts 138a and 139a taking current through the center brushes engaged with the pair 138 and 139 transmit current for two impulses to the motor per revolution of the commutator whereas the contacts 136a of the commutator sets 136 and 137 transmit current for only one impulse per revolution.

In the case of panning the movement will continue a step, or in the case of fast panning two steps, at a time for each shutter closing until the stop pan position is reached. The motor V will move immediately and does not over run. These impulses are, of course, provided by the commutator driven in synchronism with the printer motor as just pointed out. A stepping motor suitable for this purpose was located on the market and is put out under the trademark "Slosyn" by Superior Electric Company of Bristol, Conn., and is described in its bulletin SS459 which bulletin carries a 1959 copyright notice.

The Slosyn motor V is shown in FIG. 15 as being mounted beneath the member 80 which carries the linear actuator U on top of it. These members are positioned on the reverse side of the printer from the FIG. 1 showing so do not appear therein. However, any positioning of them to enable them to operate effectively will be satisfactory, though of course they should be positioned so as to be in close relationship with respect to the rockerbar X.

Outside leads L1 and L2 (FIGS. 15 and 18) feed impulses to the motor V from the commutator through the control system while the center lead C1 is directly connected to the center contact of the 25 v. D.C. rectifier 187. The motor shaft 157 has one side of an electric clutch 158 secured thereto. The clutch 158 is actuated through leads 159 and 160 in synchronism with the closing of the circuits sending current to the motor V. Thus the clutch plates 161 and 162 normally disengaged, would be engaged only when the motor goes into operation and at the same time brake Y is released. The purpose of this is to enable the rockerbar X to move freely under the action of the linear actuator U without having to turn the shaft 157 and the armature of the motor when it is actuated to move the rockerbar. This electric clutch is also a piece of apparatus available on the market and is put out by the Warner Electric Company.

The clutch plate 162 is carried on and turns with a shaft 163 which has a pulley 164 mounted on the opposite end thereof and is secured to rotate therewith. This pulley drives a belt whose opposite end passes over an idler pulley 166, which pulley is mounted on a stud shaft extending out from the bracket 167 mounted beneath the base 80 (see FIG. 14).

The belt 125 has internal teeth as seen at 165, to assure positive actuation thereof in reverse directions. As already pointed out, the bottom end 91 of the rockerbar X is clamped by means of a clamping plate 126 and is screwed to the upper run of the belt 125. Thus when current is directed to the motor V through the actuation of the commutator T the motor steps, in the direction desired while the clutch plates 161 and 162 come together so that the pulley 164 is turned to the same extent that the motor shaft 157 is turned, the belt 125 is actuated and the lower end 91 of the rockerbar is moved to the right or left, as the case may be, and for the distance required and in the desired direction. This panning continues until the circuit is broken by the circuit opening means actuated by the perforation in the tape which was formed by the actuation of the stop pan key. When the panning is stopped the brake Y goes on again to lock the rockerbar against movement.

In the wiring diagram of FIG. 18 the various elements have been keyed to the apparatus shown and described in FIGS. 1–17 by utilizing the same reference characters where applicable. Furthermore, the various stations at which the contact fingers of the reader make contact through perforations in the tape, and the various instrumentalities actuated in accordance therewith, have been correlated with FIGS. 2 and 4 and the description thereof by employing the same reference characters employed for the punches in FIG. 2 accompanied by the suffix "a." To save space, however, stations 4a to 8a inclusive have been omitted. This can be done because their showings would be merely repetitions of the showings of the relays and switches at stations 2a, 3a, 10a and 11a. Indication of such omissions is seen by the breaks in the lines at 175, 176, 177 and 178.

The principal power for the control system is 110 volt A.C. introduced into the leads 179 and 180. From this line leads 181 and 182 are taken off at the outset with 181 terminating at the 90 volt D.C. rectifier 183 which also is connected with lead 182 by means of the tap 184. Taps 185 and 186 also lead 110 v. A.C. to the 25 v. D.C. rectifier 187. The D.C. output from the rectifier 187 has a common center lead indicated at c and plus and minus leads indicated by their normal symbols. A third rectifier 188 is fed from a separate power source of 220 v. A.C. since a greater output of 115 v. D.C. is needed to properly excite the various coils from 2c through 11c of the linear actuator U.

Another source of 110 v. A.C. power is provided through the leads 189 and 190. These merely bring in the power for the circuit through the light change station 1a and for controlling the action of the light change board. It is obvious that as a perforation 1' (see FIG. 4) passes station 1a the switch 1b will be closed by the action of the energized solenoid 1s. This action causes the dropping solenoid on the light change board to act. This control is generally illustrated in the lower right hand portion of the figure, but since such a light change board arrangement per se is conventional it need not be further detailed here.

Reverting again to the lead 180, it first passes through the switch having contacts 33, 34 (FIG. 6) which is normally open but is kept closed so long as the tape R is passing over the roller 28. Should the tape R break, or run out, the switch 33, 34 will open shutting down the whole system. At the same time a switch 34, 191 will close turning on the trouble light 192.

The lead 180 next makes contact with the silver contact bar 40 (FIG. 6) and though the lead 180 is shown in dotted line in FIG. 18 as continuing past and connected at all of the stations from 2a through 16a, this is purely for illustrative purposes. It is actually the bar 40 which continues past all of the contact fingers as seen from FIG. 8.

The lead 179 continues past the tap for the trouble light 192 and past all of the stations of the system. At each of such stations taps are taken off the lead 192 to one end of each of the solenoid coils such as 25, 35, etc., to the end of the system at the station 16a and solenoid 16s. Leads from the opposite end of each of these solenoid coils engage the particular contact finger 55 for that station.

The linear actuator U has the stations 2a through 11a representative of the various positions to which the plunger 109 thereof can be moved in response to the closing of one of the circuits by a perforation in the tape passing a particular contact finger 55 in alignment therewith. The movement takes place in response to the momentary closing of the circuit and opening of it again as the tape R moves on and the contact finger rides up out of the perforation. When these circuits close, the solenoids such as 2s, 3s, etc. act to close the double pole single throw relay switches such as 2b, 2c, or 3b, 3c, etc. which close the circuit for the respective coils 2d, 3d, etc. to excite them with 115 v. D.C. from the rectifier 188.

It is to be noted that the switches of these relays have condensers bridged across them. This is to keep down the arcing which would otherwise occur at the switches as a result of the highly inductive nature of the circuits being controlled.

Besides closing their relay switches the respective solenoids act at the same time to open their normally closed micro-switch 195 one of which is provided at each station. This is important for, by tracing the leads including these switches it will be seen that they are in a circuit commencing at one contact of the rectifier 183 and returning to the other contact. In the course of this circuit the lead 196 passes through all of the micro-switches for the linear actuator stations, then through the normally closed switches 17g and 16g for the fast pan and slow pan stations and then includes the electro magnetic brake X before returning to the rectifier 183. In this way if any one of the switches in the circuit opens, the current to the electro magnet of the brake Y is cut off, the brake is rendered ineffective and the rockerarm X is free to make the single movement to the preselected position in response to the movement of the plunger of the linear actuator. As soon as the circuit controlling the action of the relay is broken, by the tape moving on, the micro-switch 195 will close again so the brake Y will be re-energized and will lock the rockerarm X in place in its new position.

While an ordinary scene is being printed, which scene is stationary as regards lateral movement across the set, the control tape R runs along through the reader and since it has no perforations in it, the only active circuit is the one that locks the electro magnetic brake Y against the rockerarm X to prevent any movement of the selector lens bracket. At the outset two perforations in the tape will have passed the reader. One of these will be at the station 1a which causes the contact bars on the light boards to drop, as previously described. The other perforation will have been the one which selects the part of the negative to be printed for that scene. This perforation will be in any one of the positions 2′ through 11′, as seen in FIG. 4, so will cause the appropriate relays at the stations 2b–11b to go into action. Assuming that station 3a has been selected for example, relay switches 3b and 3c and micro switch 195 will be actuated.

It is believed that it will be understood from the previous description of the linear actuator that, depending on which of its windings, such as 2c, 3c, 10c, and 11c shown here, receives the current through its respective relay, the plunger 109 will be moved in the desired direction and to the extent needed to move the rockerarm and the lens system for selecting the scene, or portion of the negative, to be recorded on the positive.

PANNING

The electrical system providing for panning is somewhat more complicated. A "pan" may start anywhere and at any time.

For pan operating it is first to be understood that the reader must set up both the direction and the speed of the pan. Thus in each instance it is necessary to consider a directional pan, such as a right pan at station 15a and a speed pan such as the fast pan at station 17a. As previously pointed out, the circuits to effect panning must be kept closed until the panning has been completed. This is taken care of by the use of holding circuits which are closed by the momentary action of the perforation in the tape R passing the appropriate contact finger so that contact is made for energizing the coils of the solenoids, such as 15s and 17s. At the station 15a for right panning the switch arrangement is the same as that for left panning, so only one need be described. However, to obtain reverse movement the short leads running from their switches to the common control leads are reversed as will appear.

The holding circuit at the station 15a is complete when the solenoid 15s is energized and the switch 15b is closed by raising the switch arm as shown in dotted lines. Then, even though the contact between the finger 55 and the bar 40 is cut off, the circuit will remain closed since current will flow between lead 179 and the lead 182 through the solenoid 15s, the switch 15b, the lead 15c, and the common lead 197 for all of the holding circuits. From the common lead 197 a short lead 18c extends through the normally closed stop pan switch 18b, then down through the normally closed switches 198 and 199 at the ends of the plunger 109 and from there back to the main lead 182. Hence the circuit is set up for continuing the pan until the stop pan is actuated by the appropriate perforation in the tape energizing the solenoid 18s and opening the switch 18b.

Two other single pole single throw switches 15d and 15e are closed at the "right pan" station 15a when the solenoid 15s is energized, as also shown by dotted lines. These are in circuits which carry the 25 v. D.C. current to the stepping motor V. At one side of these switches short leads 15f and 15g lead directly to the two outside taps on the motor indicated at L1 and L2, while the common lead to the motor goes directly from the common pole C on the rectifier 187 to the common pole C1 on the motor. The other leads 15h and 15k from the opposite sides of the switches 15d and 15e lead respectively to common leads 200 and 201 which have connections to similar switches at the slow pan, fast pan and left pan stations 16a, 17a and 14a. With regard to the "left pan" station 14a, however, the leads 14h and 14k from its switches 14d and 14c engage the opposite ones of the common leads 200 and 201. This reverses the polarity arrangement for the motor V to cause it to reverse its rotation.

Turning now to the situation at the fast pan station 17a and assuming that its holding circuit is closed for fast right panning due to the right pan holding circuit being closed, the switches 17d and 17e will, of course, be closed all as shown by the dotted line positions of the switch arms. However, the switch 17g is the downward closed position of a single pole double throw switch whose upper contact is 17j. If the contact at 17g were to remain closed, nothing would happen because the brake Y would still be on and would hold the rockerbar stationary against the action of the stepping motor so it is necessary to break this contact in order to release the brake. In addition it is necessary to close a circuit to engage the clutch W on the motor. These steps then are accomplished by, simultaneously with the closing of 17c and 17d, opening the contact at 17g and closing it at 17j to complete a circuit through the short lead 17L and the common lead 202 back to one side of the clutch W. The other side of the clutch W connects by the short lead 160 with the lead 196 from rectifier 183. The lead 196 continues from the other side of the rectifier through the normally closed micro-switches 195 at the linear actuated stations and back to the closed circuit contact 17j.

The speed of rotation of the motor V is constant but whether the panning proceeds one step or two steps for each closing of the shutter is governed by the portion of the commutator T employed. The commutator T is shown in detail in FIGS. 12 and 13 and diagrammatically in FIG. 18. Direction of that rotation is controlled by the reversing of "flipping over" of the outside leads to the motor as controlled by the relays at the stations 14a and 15a. Here it is to be noted that while leads 15h and 15k from switches 15d and 15e of the relay at the station 15a engage respectively the common leads 200 and 201, the reverse is true with respect to the comparable leads 14h and 14k from the comparable switches 14c and 14d of the relay station 14a. Specifically the lead 14h engages the common lead 201 while the lead 14k engages the common lead 200. By tracing the leads 136a and 137a for slow panning and the leads 138a and 139a for fast panning from the commutator through their respective fast or slow pan circuits, as the case may be, and then back to the motor through the right pan and left pan relay switches, it will be seen that this arrangement in effect flips over, or reverses, the polarity of the current going to the motor V. This then provides movement of the motor in one direction or the other and at either fast or slow speed.

The direction of rotation that this motor will take is governed by the sequence of polarity changes of the voltage impressed on the windings.

As pointed out above, the armature of the motor moves in discrete steps when the polarity of the voltage applied to the two outside leads is varied in a definite sequence. Thus assuming that one sequence is established when the leads 136a and 137a providing for slow panning are in closed circuit due to the closing of the switches at station 16a, along with the closing of the switches 15d and 15e for right panning at station 15a, then the circuit including the lead 136a will lead into the motor at L2 while the circuit including the lead 137a will lead into the motor L1. If, however, left pan is called for in place of right pan, the switches at station 15a will remain open and those at station 14a will close, in which event the circuit including the lead 136a will lead into the motor at the reverse of the outer positions, that is to say L1, while the circuit including the lead 137a will lead into the motor at the other outside position, such being L2. This change being in effect a reversal of the leads, the sequence of the voltage polarity for the motor will, accordingly, be changed and the direction of rotation of the motor will be reversed.

For more ready comprehension of the manner in which this motor operates and is reversed, the following diagram illustrative of the polarities of voltage received by the windings for clockwise and counter-clockwise rotation of the motor as the commutator rotates is believed to clarify the situation.

*Direction of rotation*

|  | Clockwise | | Counter Clockwise | |
| --- | --- | --- | --- | --- |
|  | Winding I | Winding II | Winding I | Winding II |
| 1st step | + | + | + | + |
| 2d step | − | + | + | − |
| 3d step | − | − | − | − |
| 4th step | + | − | − | + |
| 5th step | + | + | + | + |
| 6th step | − | + | + | − |
| 7th step | − | − | − | − |
| 8th step etc | + | − | − | + |

The same arrangement prevails with respect to polarity of the voltage received by the motor through the leads 138a and 139a from the pairs of commutator members 138 and 139 for fast pan, excepting that of course there are twice as many impulses directed to the motor following the pattern illustrated in the foregoing diagram. Thus the motor will run twice as fast in the direction selected.

The electric system also includes a safeguard against the overrunning of the panning in either direction in the event the operator neglected to make the proper perforation for stopping the panning, or should the stop pan for some reason fail to function. Normally the stop pan by breaking the circuit at the normally closed switch 18b would bring the panning action to a stop. Should this switch remain closed, however, the panning would tend to continue right on. This, however, is prevented by the fact that the plunger 109 would, under these circumstances, be freely moving with the movement of the rocker arm X so it likewise would be moved too far. This is prevented, however, by the provision of normally closed switches 198 and 199 positioned to be opened by over travel of the plunger 109 in either direction. As soon as either one of these were opened it would have the same effect as the stop pan switch 18b and thus bring the panning to a stop. This is all that would be necessary so long as the switches 198 and 199 were positioned to be opened as soon as the plunger 109 tended to overtravel. As here shown, however, provision is included for resetting the lens system to the extreme position at either right or left. This resetting is done by employing the end stations of the linear actuator to do the job.

Considering the plunger 109 as seen in FIG. 18, it will be seen that if it moves too far to the left it will not only open the switch 199 but also close the circuit through the contact member 204. By tracing the circuit through the lead 2e it will be seen that it brings into action the solenoid 2s at the station 2a so that the plunger will be brought to that position in the linear actuator. If the plunger 109 should move too far to the right, as seen in FIG. 18, it would, besides opening the switch 198, close that at 203. In this event by following the lead 11e it will be seen that the solenoid 11s will be energized thereby resetting the plunger to the opposite end position.

From the foregoing it is believed to be clear how the modification of an optical printer can be effected for the pre-selection of the desired portions of a wide angle scene recorded on a motion picture film whether or not in laterally compressed condition. First the editor perforates the control tape in a manner desired which, in his judgment, selects the scene material from the wide angle scene recorded which to him appears to best portray the action. As the first step in this he selects the scenes and moves from scene to scene so that the perforations in the tape acting through the reader P actuate the linear actuator U at the appropriate time and to the extent needed for making the scene changes. While the linear actuator is operating, the clutch to the stepping motor is disconnected so that the linear actuator can operate the rockerbar X without any drag from the motor. Then, when panning is desired in accordance with the preselection made by the operator, the impulses are again transmitted through the contacts of the reader to the motor V and to the clutch W to engage the clutch and cause the motor to step to the desired extent in the desired direction for swinging the rockerbar X in order to move the lens system E, either fast or slow in accordance with the panning required. This is done without resistance from the linear actuator inasmuch as the plunger 109 thereof moves freely when no current is flowing to the actuator.

The operation of the printer controlled by the foregoing instrumentalities is automatic form start to finish of a reel of film and the operation can be repeated again and again for the making of the desired number of prints whether 35 mm. for use in television, for use in theatres not equipped with wide screens, or 16 mm. and for home movies. As pointed out above, the film from which the copies are made can be either a negative or a positive. In the latter case, of course, the copies produced are negatives. Furthermore the film to be copied from, though of a different aspect ratio than that of the copy, need not have the scenes recorded thereon compressed in one dimension. Wide scene recordings of other types can be used. Accordingly, though the specific example of the invention given is related to a film to be copied from having the scenes recorded thereon compressed horizontally, it is to be understood that the performance of the method and utilization of the apparatus of the invention are not to be considered as being limited by that example.

In other respects also it will be clear to those skilled in the art that the above described example of a practice of the invention is only by way of illustration and that other useful modifications thereof may be employed. Speaking more generally, it is to be understood that since certain changes in carrying out the above method and in the constructions set forth, which embody the invention may be made without departing from its scope, it is intended that all matter contained in the above description or shown in the accompanying drawing shall be interpreted as illustrative and not in a limiting sense.

Having described our invention what we claim as new and desire to secure by Letters Patent is:

1. In the printing of motion picture film the method of making copis of one aspect ratio from exposed and developed motion picture films having scenes recorded thereon of another aspect ratio which comprises, selecting a portion limited in one direction of the image recorded on the exposed and developed film to be copied onto a second motion picture film, forming a master control member in correspondence with said selection, moving said first film for making of a copy therefrom, moving said second motion picture film in synchronism with the movement of said first motion picture film while using said master control member for variably selecting the limited portion of said film to be copied and making a print of said limited portion on said second motion picture film by exposing said second motion picture film to a projection of said limited portion while changing the aspect ratio of said second motion picture film with respect to that of said first film.

2. The method as in claim 1 and including, effecting said copying by means of an optical system and moving said optical system transversely with respect to its axis to center said system with respect to the center position of said limited portion.

3. The method as in claim 1 and including, changing said aspect ratio by exposing said second film through an aperture having a dimension corresponding with said limited portion of said one dimension and masking out all but said limited portion of said picture projected by said optical system by means of said aperture.

4. The method as in claim 2 and including, effecting said movement of said optical system by swinging the same a short distance on an arc of long radius with respect to the extent of said swing.

5. The method as in claim 2 and including, moving said second film intermittently past an exposure area, shutting off the exposure of said second film during said movement and moving said optical system while said exposure is shut off.

6. The method as in claim 5 and including, effecting the complete movement of said optical system from one preselected scene recorded on said first film to the next during a single shutting off of said exposure.

7. The method as in claim 5 and effecting movement of said optical system for panning a step at a time one step being taken at each shutting off of said exposure.

8. The method as in claim 5 and effecting movement of said optical system for panning several steps for each shutting off of said exposure.

9. The method of making a copy of a preselected portion of the width of a wide scene recorded on a film which comprises, moving said wide scene film intermittently while selecting a limited portion of said width, variably positioned as the movement of said film progresses, for optical copying on a second motion picture film, forming a master control member in correspondence with said selection, positioning said wide scene film and said film to be printed upon at opposite ends of an optical system, moving said optical system to various positions across the width of said wide scene film in response to signals provided by said master control member, as said wide scene film is moved, changing the aspect ratio of the copy to be made with respect to that of the wide scene by reducing the width of the scenes to be copies and making a copy of said variably positioned selected limited portion by recording the same on said second motion picture film.

10. A method as in claim 9 and including said wide scene film having the images thereon compressed widthwise and decompressing said images by means of said optical system.

11. A method as in claim 9 and including repeating the steps thereof a plurality of times to make a plurality of identical copies.

12. A method as in claim 9 and including making more than one copy at the same time.

13. A method as in claim 9 and holding said optical system stationary while said films are stationary between said intermittent movements to center said lens system with respect to successive preselected portions of said wide scene recordings and means for printing scenes on said film to be printed upon at a different aspect ratio from that of said film to be printed from.

14. Apparatus for automatically printing motion picture images in accordance with preselected portions of wide scene recordings on motion picture films which comprises, means for positioning motion picture film to be printed from and motion picture film to be printed upon in spaced relationship, means for moving said films intermittently in synchronism, a projection lens system, means for mounting said lens system between said film positioning means, means for moving said lens system transversely with respect to the path of movement of film moved by said film moving means and means for controlling said movement in accordance with a preselected pattern.

15. Apparatus as in claim 14, said means for printing at a different aspect ratio including masking means having the desired length to width ratio positioned in front of the film to be printed upon.

16. Apparatus as in claim 14, said mounting means for said lens system including a pivotal mounting spaced substantially from said lens system.

17. Apparatus as in claim 16, the extent of the spacing of said lens system from said pivotal mounting being many times greater than the short distance which said lens system is moved from one extreme position to the other to produce an arcuate path of transverse movement for the axis of said lens system that is substantially flat, whereby distortion produced by the axis of the lens system being moved laterally to different positions along an arc is substantially eliminated.

18. Apparatus as in claim 16, said means for moving said lens system including means for swinging said lens system about said pivotal mounting for effecting said transverse movement.

19. Apparatus as in claim 14 and including means correlated with the movement of said film for locking said lens system against movement while said film moving means is ineffective for moving said film.

20. Apparatus as in claim 19 and including a rotatable shutter mounted between said film positioning means and formed to block off the light path to said film to be printed upon while said intermittent means is moving said film, and means for unlocking said locking means while said shutter blocks off said light path.

21. Apparatus as in claim 20 and including, means for moving said lens system moving means the distance required by said movement controlling means for a scene change of said film to be printed from while said locking means is unlocked.

22. Apparatus as in claim 20 and said means for moving said lens system transversely including step by step moving means for effecting panning, moving said system one step during each successive blocking off of said light path by said shutter.

23. Apparatus as in claim 20 and said means for moving said lens system transversely including step by step moving means, for effecting panning, moving said system two steps during each successive blocking off of said light path by said shutter.

24. In an optical printer for making copies from a master motion picture film, a projection lens system, a bracket for mounting said lens system for movement of the same and the axis thereof transversely with respect to the direction of said axis, pivotal mounting means for mounting said lens system for said movement, said pivotal mounting means being remotely positioned with respect to said axis, and means for swinging said lens system about said pivotal mounting means for centering said lens system with respect to selected lateral portions of a film to be copied.

25. A printer as in claim 24, said means for swinging said lens system about said pivotal mounting means including means for changing the lateral position of said lens system for change of scene and stepping means for changing the lateral position of said lens system for panning.

26. A printer as in claim 24, said means for swinging said lens system including a rocker arm, means operatively connecting said rocker arm with said bracket and means rocking said rocker arm for effecting scene changes and means rocking said rocker arm step by step for effecting panning.

27. A printer as in claim 26, said means for rocking said rocker arm for effecting scene change comprising an electrically operated linear actuator and said means for effecting panning comprising an electric stepping motor.

28. A printer as in claim 27 and including an electrical control system for actuating said linear actuator on said stepping motor alternately in accordance with a preselected pattern.

29. A printer as in claim 28 and including switch means for preventing operation of either one of said linear actuator or stepping motor while the other thereof is being actuated.

30. A printer as in claim 28 and including means for causing one of said linear actuator and said stepping motor to run free while the other thereof is being operated.

31. A printer as in claim 28 and including brake means for rendering said rocker bar immovable while neither of said linear actuator or stepping motor is in operation.

32. In an optical printer for making copies from a master motion picture film, a projection lens system, means for moving said lens system transversely with respect to the axis thereof to center the same with respect to transverse portions of the film being copied from, electrical apparatus for actuating said lens system moving means, said apparatus including one element for effecting movement of said system in complete steps of varying extent and said apparatus including another element for effecting movement of said lens system in a plurality of steps each of the same extent, electric switch means controlling the operation of said apparatus and control means for selectively operating said elements of said apparatus during the operation of said printer.

References Cited by the Examiner
UNITED STATES PATENTS

| | | | |
|---|---|---|---|
| 2,388,961 | 11/45 | Elliott et al. | 95—4.5 |
| 2,517,250 | 8/50 | Shea et al. | 88—24 |
| 2,701,991 | 2/55 | Croucher | 95—4.5 |
| 2,909,095 | 10/59 | Ulffers | 352—79 |
| 2,955,520 | 10/60 | McCullough | 95—75 |

NORTON ANSHER, *Primary Examiner.*

EMIL G. ANDERSON, *Examiner.*